United States Patent [19]

Harper

[11] Patent Number: 5,032,671
[45] Date of Patent: Jul. 16, 1991

[54] PREPARATION OF LACTONE POLYMERS USING DOUBLE METAL CYANIDE CATALYSTS

[75] Inventor: Stephen D. Harper, West Chester, Pa.

[73] Assignee: Arco Chemical Technology, Inc., Wilmington, Del.

[21] Appl. No.: 576,865

[22] Filed: Sep. 4, 1990

[51] Int. Cl.$^5$ .............................................. C08G 63/82
[52] U.S. Cl. ..................................... 528/357; 528/358
[58] Field of Search ................................ 528/357, 358

[56] References Cited

U.S. PATENT DOCUMENTS

| | | | |
|---|---|---|---|
| 3,278,457 | 10/1966 | Milgrom | 260/2 |
| 3,278,458 | 10/1966 | Belner | 260/2 |
| 3,278,459 | 10/1966 | Herold | 260/2 |
| 3,404,109 | 10/1968 | Milgrom | 260/611 |
| 3,427,256 | 2/1969 | Milgrom | 252/431 |
| 3,427,334 | 2/1969 | Belner | 260/429 |
| 3,427,335 | 2/1969 | Herold | 260/429 |
| 3,538,043 | 11/1970 | Herold | 260/40 |
| 3,829,505 | 8/1974 | Herold | 260/611 B |
| 3,900,518 | 8/1975 | Milgrom | 260/573 |
| 3,941,849 | 3/1976 | Herold | 260/607 A |
| 4,472,560 | 9/1984 | Kuyper et al. | 526/120 |
| 4,477,589 | 10/1984 | Hulst et al. | 502/169 |

OTHER PUBLICATIONS

K. Ivin and T. Saegusa, Ring-Opening Polymerization, (1984), vol. 1, Ch. 7, pp. 461-521.
Advances in Chemistry Series, No. 128, Polymerization Kinetics and Technology (1973), Ch. 15, pp. 209-210.
Macromolecular Syntheses 5(1974)9.

Primary Examiner—Morton Foelak
Attorney, Agent, or Firm—Jonathan L. Schuchardt

[57] ABSTRACT

Lactone monomers are polymerized using double metal cyanide compounds as catalysts to yield useful lactone polymers. Block or random copolymers of lactones and epoxides may also be prepared.

20 Claims, No Drawings

PREPARATION OF LACTONE POLYMERS USING DOUBLE METAL CYANIDE CATALYSTS

FIELD OF THE INVENTION

This invention relates to the synthesis of lactone polymers using double metal cyanide compounds. These compounds have been found to effectively catalyze the polymerization of lactones, including ε-caprolactone, or mixtures of lactones with epoxides, to form polyester or polyetherester polyols as well as high molecular weight polymers. The polyols, which have narrow molecular weight distributions and true functionalities, are useful intermediates for polyurethanes.

BACKGROUND OF THE INVENTION

The polymerization of lactone monomers and the copolymerization of lactone monomers and epoxide monomers yield polymeric products useful in a wide variety of applications. For example, caprolactone polyols find utility in polyurethane coatings, adhesives, and thermoplastic urethane and castable polymers. Higher molecular weight lactone polymers serve as processing aids and modifiers for resins such as ABS and polycarbonate and as hot melt adhesives. Aliphatic polyesters such as polycaprolactone exhibit exceptionally high compatibility or miscibility with a variety of common polymeric resins.

Lactones have been successfully polymerized using several different types of catalysts including, for example, metalloporphyrin catalysts, bimetallic oxoalkoxides, mixed alkoxyalkyl compounds of zinc and tin, alkyllithium compounds, basic catalysts such as alkali metal hydroxides and Lewis acid catalysts such as boron trifluoride. A general discussion of lactone polymerization may be found in K. Ivin and T. Saegusa, *Ring-Opening Polymerization*, Vol. 1, Chapter 7, pp 461-521.

Some of the known lactone polymerization catalysts are known to have certain practical limitations. These limitations include: the occurrence of undesirable side reactions; the lack of complete control over molecular weight, molecular weight distribution, or end-group functionality; the need to use relatively large concentrations of catalyst. Thus, development of an improved catalytic process wherein these difficulties may be avoided would be highly desirable.

SUMMARY OF THE INVENTION

This invention provides a process for producing a lactone polymer comprising contacting a reaction mixture containing at least one lactone monomer with a catalytically effective amount of a double metal cyanide compound for a time and at a temperature effective to polymerize the lactone monomer.

The process is optionally conducted in the presence of a hydroxyl-group-containing initiator, which controls the functionality and molecular weight of the polymer. The process may optionally be performed in an organic solvent.

The invention also provides a process for producing a lactone-epoxide copolymer comprising contacting a reaction mixture containing at least one lactone monomer and at least one epoxide monomer with a catalytically effective amount of a double metal cyanide compound for a time and at a temperature effective to copolymerize the lactone monomer and epoxide monomer.

Also provided by this invention is a process for producing a copolymer comprising contacting a reaction mixture of (1) a polymeric active hydrogen-containing initiator selected from the group consisting of epoxide polymers, lactone polymers, and epoxide-lactone copolymers, and (2) at least one cyclic monomer selected from the group consisting of lactones and lactone/epoxide mixtures with a catalytically effective amount of a double metal cyanide compound for a time and at a temperature effective to polymerize the cyclic monomer.

The polymers produced by the process of the invention have relatively narrow molecular weight distributions and molecular weights that agree well with expected values. Random and block copolymers can be prepared.

DETAILED DESCRIPTION OF THE INVENTION

Lactones useful in the process of the invention include lactones having 4-membered or larger rings. Lactones having 5-membered rings, such as γ-butyrolactone and substituted derivatives thereof, generally resist polymerization with cationic, anionic, and coordination catalysts, are are not expected to polymerize using the process of the invention. Many lactones having 6-membered rings or greater, substituted or unsubstituted, will polymerize in the presence of the double metal cyanide catalysts described herein. Unsubstituted lactones are preferred for use due to their generally higher rate of polymerization. Suitable lactones for use in the invention include, but are not limited to, β-propiolactone, δ-valerolactone, ε-caprolactone, methyl-ε-caprolactone, β,β-dimethyl-β-propiolactone, β-methyl-β-propiolactone, α-methyl-β-propiolactone, α,α-bis(chloromethyl)propiolactone, methyoxy-ε-caprolactone, ethoxy-ε-caprolactone, cyclohexyl-ε-caprolactone, phenyl-ε-caprolactone, benzyl-ε-caprolactone, ζ-enantholactone, η-caprylolactone, α,β,γ-trimethoxy-δ-valerolactone, β-butyrolactone, and the like, and mixtures thereof. ε-Caprolactone is the preferred lactone.

The double metal cyanide compounds suitable for use as catalysts in the present invention are described in detail in U.S. Pat. Nos. 3,427,256, 3,427,334, 3,278,458, 3,427,335, 3,278,457, 3,278,459, 3,404,109, 3,829,505, 3,900,518, 3,941,849, 3,538,043, 4,477,589, and 4,472,560, the teachings of which are incorporated herein by reference in their entirety. The catalysts have the general structure:

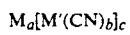

and/or

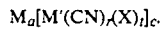

wherein M is a metal that forms a metal-oxygen bond that is relatively more stable than the coordinate bond between the metal and the nitrogen group of the cyano bridging group, M' is a transition metal that bonds with the carbon atoms of the cyano groups, and X represents a bridging group other than cyano that may optionally be present. The subscripts a, b, c, r, and t are integers. In most instances, b corresponds to the coordination number of M' and is usually 6. Also, r+t is usually 6, r>t, and t may be 0. The total net positive charge on M times the value of a should equal the total net negative charge on M' $(CN)_b$ or M'$(CN)_r(X)_t$ times the value of c. An individual catalyst can contain more than one type of M or M' metal ion in its structure.

M is a metal preferably selected from the group consisting of Zn(II), Fe(II), Fe(III), Co(II), Ni(II), Mo(IV), Mo(VI), Al(III), V(IV), V(V), Sr(II), W(IV), W(VI), Mn(II), and Cr(III).

M' is a metal preferably selected from the group consisting of Fe(II), Fe(III), Co(II), Co(III), Cr(II), Cr(III), Mn(II), Mn(III), V(IV), Ir(III), and V(V).

Examples of catalysts fitting the above description that may be used in the process of this invention include, but are not limited to, zinc hexacyanoferrate(III), zinc hexacyanoferrate(II), nickel(II) hexacyanoferrate(II), nickel(II) hexacyanoferrate(III), zinc hexacyanocobaltate(II), zinc hexacyanocobaltate (III), zinc hexacyanomanganate(II), zinc hexacyanochromate(III), iron(III) hexacyanoferrate(III), vanadium(V) hexacyanoferrate(III), zinc hexacyanoiridium (III) and the like. As described in the U.S. patents listed above, the catalytic activity of double metal cyanide compounds may be enhanced by the incorporation of co-catalytic components such as ethers, ketones, zinc chloride, water, hydrogen chloride, zinc sulfate, and the like.

A particularly preferred catalyst is zinc hexacyanocobaltate(III). An especially active form of this catalyst has the general formula:

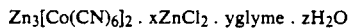

$$Zn_3[Co(CN)_6]_2 \cdot xZnCl_2 \cdot yglyme \cdot zH_2O$$

The details of the preparation of this catalyst are given by R. Herold and R. Livigni in "Hexacyanometalate Salt Complexes as Catalysts for Epoxide Polymerization," *Advances in Chemistry Series, No. 128, Polymerization Kinetics and Technology* (1973), Chapter 15, pp. 209–210, and in *Macromolecular Syntheses*, Vol. 5, p. 9 (1974), the teachings of which are incorporated herein by reference in their entirety.

The amount of catalyst to be used will depend on the particular application. Typically, the amount will be within the range of about 50 to 10,000 parts per million based on the final weight of polymer to be prepared. More preferably, an amount within the range of about 250 to 2,000 ppm is used. Faster polymerization rates will be realized with higher levels of catalyst, while lower cost and better control of reactivity are the advantages of low catalyst levels.

Epoxides may optionally be copolymerized with the lactones to form polyetheresters (i.e., epoxide-lactone copolymers). The epoxides and lactones may be present in any proportion; generally, however, there is at least about 1 mole percent of the lactone monomer present. Examples of suitable epoxides that may be used include, but are not limited to, ethylene oxide, propylene oxide, isobutylene oxide, 1,2-butene oxide, 2,3-butene oxide, styrene oxide, butadiene monoxide, 1,2-pentene oxide, cyclohexene oxide, allyl glycidyl ether, phenyl glycidyl ether, and the like, and mixtures thereof. Particularly preferred are ethylene oxide, propylene oxide, and 1,2-butene oxide.

Active hydrogen-containing initiators are also optional components in the lactone polymerization mixture. These are useful for controlling the molecular weight and functionality of the resulting polymers. The initiator reacts with the monomer in the presence of the double metal cyanide catalyst in such a manner as to ring-open the monomer. The molecular weight of the growing polymer chain thus increases as additional monomer units are added to the initiator. If no initiator is used, it is believed that traces of water and other active hydrogen-containing species serve as initiators. The molecular weight of the polymers obtained will typically be very high in the absence of an initiator—usually greater than about 50,000. If water is the primary initiator the polymer will have a functionality of 2 (diol). In order to prepare lactone-derived polymers having molecular weights and functionalities useful for polyurethane applications, a low molecular weight polyalcohol having a molecular weight within the range of about 50 to 1000 and from 2 to 8 hydroxyl end groups is typically employed.

The functionality (i.e., average number of active hydrogen groups per chain) of the polymer product will be approximately the same a the functionality of the active hydrogen-containing initiator. For example, if glycerin is used as the initiator, the predominant lactone polymer component will be a triol. The molecular weight is regulated by controlling the mole ratio of polymerizable monomers to initiator. The molecular weights of the polymers obtained by the process of the invention agree well with the theoretical values calculated from the monomer/initiator ratio, presumably due to the absence of side reactions that affect functionality when double metal cyanide catalysts are used. Molecular weights can be determined by any suitable means, including gel permeation chromatography, light scattering, or hydroxyl number analysis.

Examples of suitable hydroxyl group-containing initiators include, but are not limited to, water, ethylene glycol, propylene glycol, dipropylene glycol, tripropylene glycol, diethylene glycol, triethylene glycol, glycerin, trimethylolpropane, dimethylolpropane, neopentyl glycol, 1,3-propanediol, 2-methyl-1,3-propanediol, 1,4-butanediol, sucrose, pentaerythritol, 1,6-hexanediol, propoxylated and ethoxylated glycerin, and the like, and mixtures thereof.

Examples of other suitable active hydrogen-containing compounds suitable for use as initiators include phenols such as bisphenol A, thiols such as 1,2-ethane dithiol, epoxy alcohols such as glycidol, enolizable aldehydes and ketones such as acetone and butyraldehyde, and primary and secondary amines such as p-phenylene diamine.

In another embodiment of this invention, the initiator employed may be a polymeric active hydrogen-containing initiator. If the initiator has a chemical composition different from that of the lactone or lactone-epoxide monomer mixture with which it is reacted, useful block copolymers are obtained. Preferably, the initiator is selected from the group consisting of epoxide polymers, lactone polymers, and epoxide-lactone copolymers. Such initiators may be obtained by double metal cyanide-catalyzed polymerization or by other known methods. Commercially available epoxide polymers such as propylene oxide polyols and ethylene oxide/propylene oxide polyols, or lactone polyols such as caprolactone polyols may be used, for example. Other polymeric active hydrogen-containing initiators may also be employed, of course, including tetrahydrofuran polyols, polyvinyl alcohol, polyester glycols, hydroxy-functionalized polystyrene, hydroxy-functionalized polybutadiene, and the like. In this embodiment of the invention, the number average molecular weight of the polymeric initiator is from about 1000 to 100,000. The number of active hydrogens per polymeric initiator is preferably from 1 to 8.

The process of the invention can be performed in bulk or in the presence of an organic solvent. The solvent helps to dissipate the heat of reaction during polymerization and aids mixing of the reactants. As the polymer forms, the solvent keeps the mixture stirrable. Because double metal cyanide compounds are often highly active catalysts, the use of a solvent also helps to keep the polymer viscosity low and the molecular weight distribution narrow.

The organic solvent can be an aromatic or aliphatic hydrocarbon, or an ether. Examples of suitable solvents include, but are not limited to, heptane, hexanes, toluene, benzene, xylenes, ether, dioxane, dimethoxyethane, tetrahydrofuran, methyl tetrahydrofuran and the like, and mixtures thereof. Particularly preferred as a polymerization solvent is tetrahydrofuran; use of this solvent tends to yield shorter initiation times, lower levels of unsaturation, and narrower molecular weight distributions.

The temperature at which the polymerization is performed is not critical. Typical temperatures are within the range of about 0° C. to 175° C. A particularly preferred range is from about 40° C. to about 125° C. At temperatures below about 0° C., reaction rates are ordinarily too slow to be useful; at temperatures greater than about 175° C., undesirable side reactions may compete with the desired reaction pathway.

The polymerization is preferably performed under inert and/or nonoxidizing conditions, for example, under an inert atmosphere of nitrogen, argon, or the like. The reaction is desirably performed at or above atmospheric pressure, especially when volatile monomers such as ethylene oxide or propylene oxide are involved. With nonvolatile monomers, the reaction may be performed below atmospheric pressure.

An induction period of several minutes to several hours may be observed, depending upon catalyst composition, reaction temperature, catalyst concentration, initiator identity and concentration, and solvent used, among other variables. This is a time period following combination of monomer, catalyst, and initiator during which little to no conversion of monomer occurs. Once the catalyst becomes active, rapid monomer conversion accompanied by an exotherm is often observed. The start of the reaction, which is usually accompanied by a drop in reactor pressure when volatile monomers are used, marks the end of the induction period.

The order and method of addition of reactants is usually not critical. Ordinarily, the catalyst, initiator (if any) and solvent (if any) are combined in a suitable reactor. An initial charge of monomer may be added first, with the remaining monomer to be added following catalyst activation. The catalyst will ordinarily not become active in the absence of at least a small amount of monomer. For small-scale reactions, all of the monomer mixture may be added initially. If more than one monomer is used, the order of addition of monomers will affect the composition of the polymer.

Random copolymers will typically result if the monomers are mixed prior to polymerization. Block copolymers can be prepared by adding one monomer first and allowing it to react before addition of the second monomer. For example, a ε-caprolactone-capped poly(propylene oxide) triol can be made by first reacting a triol initiator and propylene oxide in the presence of a double metal cyanide catalyst to make a poly(PO) triol, followed by reaction with ε-caprolactone to make the capped polyol.

The catalyst maintains its activity toward lactone or epoxide monomers until it is deactivated by chemical treatment or until it is physically separated from the polymer. It is generally desirable to remove the catalyst from the polymer because catalyst residues can cause depolymerization and build-up of volatile by-products in the polyol. Residual catalyst may also adversely affect the reactivity of the polyols used in polyurethane formulations.

Following polymerization, reaction solvents or unreacted monomers may be removed from the polymer by any suitable means, including rotary evaporation, distillation, and the like. A wiped-film evaporator is quite useful for removing traces of volatile materials from the polyol.

Lactone polymers made with double metal cyanide catalysts typically have low polydispersity and narrow molecular weight distributions ($M_w/M_n$). The values will depend on many factors. Factors that tend to favor narrower molecular weight distributions include high catalyst concentrations, dilution with a solvent, slow addition of monomer, good mixing, and low reaction temperature. Mixing is especially important. Typically, the molecular weight distributions will be within the range of about 1.1 to 2.0.

Another feature of the lactone polymers made using the process of this invention is their true functionality. The polymers have very low unsaturation values. When propylene oxide is used as a comonomer, the unsaturation values are typically less than about 0.010 meq/g. Copolymers of propylene oxide and lactones made with conventional base catalysts such as potassium hydroxide will typically have a higher proportion of unsaturated end groups due to isomerization of some of the propylene oxide to allyl alcohol under basic conditions. The allyl alcohol acts as an initiator, yielding monofunctional polymers. These monofunctional polymers may adversely affect the physical properties of the formulated polyurethanes.

The following examples are meant to illustrate the invention. One skilled in the art will recognize variations on the examples that are within the spirit and scope of the claims.

EXAMPLE 1

Preparation of Poly(ε-caprolactone) Homopolymer

A one-liter stainless steel autoclave reactor equipped with external heating jacket, internal cooling-water coil, thermocouple, motor-driven stirrer, and inlets for monomer addition, reactor pressurization, and reagent introduction, was charged with 1,4-butanediol (10.24 g), zinc hexacyanocobaltate/ zinc chloride/glyme/water catalyst (0.25 g, 100 ppm; prepared in accordance with the procedure described in *Macromolecular Syntheses*, Vol. 5, p. 9 (1974)), and tetrahydrofuran (100 mL). The reactor was purged several times with nitrogen, then pressurized to about 5 psi. The reactor contents were stirred and heated to 90° C. over a 1.5-hour period. ε-Caprolactone (30 g) was added in one portion from a load-cell reservoir, and the mixture was heated for 4 hours to initiate polymerization. Internal temperature was regulated automatically by circulation of cool water as needed to maintain reactor temperature within desired limits. The remaining ε-caprolactone (210 g) was added at a rate of about 20 g/hour at 90° C. About 6-8 hours following addition of the ε-caprolactone, the product was cooled, drained from the reactor, and filtered twice through a glass-fritted funnel containing diatomaceous earth. Tetrahydrofuran was removed from the product using a rotary evaporator. Residual ε-caprolactone was removed by passing the polymer product through a wiped-film evaporator at 150° C. The product was a waxy solid having a hydroxyl number of 53 mg KOH/g and a GPC number average molecular weight of 2100. $^{13}$C NMR spectroscopy confirmed that the product was polycaprolactone.

EXAMPLE 2

Preparation of a Poly(ε-Caprolactone/Propylene Oxide) Random Copolymer

The one-liter reactor described in Example 1 was charged with a 480 molecular weight poly(propylene oxide) triol initiator (78.9 g), zinc hexacyanocobaltate/zinc chloride/glyme/water catalyst (0.575 g, 1000 ppm), and tetrahydrofuran (60 mL). The load cell was charged with a mixture of ε-caprolactone (140 g) and propylene oxide (357 g). The reactor was purged several times with nitrogen, then pressurized to about 5 psi. The reactor contents were stirred and heated to 90° C. over a 1.5 hour period. An initial charge of 37 g of the ε-caprolactone/PO mixture was added to the reactor. A pressure drop was observed about 1 hour after addition of the initial charge, indicating that initiation of the catalyst had occurred. The remainder of the ε-caprolactone/PO mixture was added over about a 10-hour period. The product was heated for an additional 8 hours at 90° C. following addition of the monomer mixture, then cooled, drained from the reactor, and filtered through diatomaceous earth. Tetrahydrofuran was removed using a rotary evaporator. Residual ε-caprolactone was removed by passing the polymer product through a wiped-film evaporator under vacuum at 150° C. The triol product had a hydroxyl number of 51.0 mg KOH/g and a GPC number average molecular weight of 2980.

EXAMPLE 3

Preparation of Poly(ε-Caprolactone/Propylene Oxide) Block Copolymer

The one-liter reactor previously described was charged with a 480 molecular weight poly(propylene oxide) triol (78.9 g), zinc hexacyanocobaltate/zinc chloride/glyme/water catalyst (0.575 g, 980 ppm), and tetrahydrofuran (60 mL). The load-cell reservoir was charged with propylene oxide (341 g). The reactor was purged several times with nitrogen, then pressurized to about 5 psi. The reactor contents were stirred and heated to 90° C. over a 1.5 hour period. An initial charge of 37 g of PO was added to the reactor. A pressure drop was observed about 1 hour after addition of the initial charge, indicating that initiation of the catalyst had occurred. The remaining PO was added over about a 10-hour period. The product was heated for an additional 8 hours at 90° C. following addition of the propylene oxide. ε-Caprolactone (165 g was charged to the load-cell reservoir, and was added to the reactor at 90° C. at a rate of about 40 g/hour. The product was heated for an additional 8 hours at 90° C. following addition of the ε-caprolactone. The product was cooled, drained from the reactor, and filtered through diatomaceous earth. Tetrahydrofuran was removed using a rotary evaporator. Residual ε-caprolactone was removed by passing the polymer product through a wiped-film evaporator under vacuum at 150° C. The ε-caprolactone-capped poly(PO) triol product had a hydroxyl number of 60.5 mg KOH/g and a GPC number average molecular weight of 2410.

TABLE 1

| Product type: | ε-Caprolactone Polymers | | | Commercial* Homopolymer |
| --- | --- | --- | --- | --- |
| | Random | Block | Homopolymer | |
| Example # | 2 | 3 | 1 | |
| Initiator MW | 480 | 480 | 90 | |
| Catalyst, ppm | 1000 | 980 | 1000 | |
| Mn, calc | 3170 | 2800 | 1900 | |
| Mn, GPC | 2980 | 2410 | 2100 | 2100 |
| Mw/Mn | 1.72 | 1.32 | 1.54 | 2.00 |
| Unsat (meq/g) | 0.008 | 0.005 | 0.002 | 0.005 |
| OH # (mg KOH/g) | 51.0 | 60.5 | 53.1 | 56.5 |
| MW (OH #) | 3300 | 2780 | 2110 | 1990 |
| Viscosity at 60° C. (cps) | 330 | 230 | | |

*Aldrich Chemical Company

EXAMPLE 4

Preparation of Poly(δ-Valerolactone) Homopolymer

The procedure of Example 1 is followed except that a total of 211 g of δ-valerolactone is used in place of ε-caprolactone. The product isolated is expected to be a homopolymer diol of δ-valerolactone having a molecular weight of about 2000.

EXAMPLE 5

Preparation of High Molecular Weight Poly(ε-Caprolactone) Diol

The procedure of Example 1 is followed except that 1,4-butanediol is omitted and zinc hexacyanoferrate/zinc chloride/glyme/water prepared as described in *Macromolecular Syntheses*, Vol. 5, p. 9 (1974) is used as the catalyst. The product isolated is expected to be a homopolymer of ε-caprolactone having a molecular weight greater than about 50,000.

EXAMPLE 6

Preparation of Poly(β-Propiolactone) Diol

The procedure of Example 1 is followed except that a total of 151 g of β-propiolactone is used in place of ε-caprolactone. The product is isolated is expected to be a homopolymer diol of β-propiolactone having a molecular weight of about 2000.

EXAMPLE 7

Preparation of High Molecular Weight Poly(β-Propiolactone) Diol

The procedure of Example 6 is followed except that 1,4-butanediol is omitted and the zinc hexacyanoferrate/zinc chloride/glyme/water catalyst of Example 5 is employed. The product isolated is expected to be a homopolymer of β-propiolactone having a molecular weight greater than about 50,000.

EXAMPLE 8

Preparation of a Random Poly(β-Propiolactone/PO) Copolymer Triol

The procedure of Example 2 is followed, except that 88.3 g of β-propiolactone is used in place of ε-caprolactone. The product isolated is expected to be a copolymer triol of β-propiolactone and propylene oxide having a molecular weight of about 3000.

EXAMPLE 9

Preparation of a β-Propiolactone-Capped Poly(PO) Block Copolymer Triol

The procedure of Example 3 is followed, except that 27 g of 480 molecular weight poly(PO triol initiator is used, along with 423 g of propylene oxide. β-Propiolactone (112 g) is used in place of ε-caprolactone. The product isolated is expected to be a β-propiolactone-capped poly(PO) triol having a molecular weight of about 10,000.

EXAMPLE 10

Preparation of a Block Copolymer of Ethylene Oxide/Propylene Oxide and Caprolactone A polymeric active hydrogen-containing initiator is prepared using 180.8 g of a monomer mixture containing 80% by weight propylene oxide and 20% by weight ethylene oxide, 19.2 g tripropylene glycol initiator, and potassium hydroxide as catalyst. After complete reaction of the monomer mixture at a reaction temperature of 110° C., the potassium catalyst is removed by treatment with magnesium silicate to yield a 2000 molecular weight random propylene oxide/ethylene oxide diol.

The 2000 molecular weight polymeric initiator is placed in the one-liter reactor described in Example 1 together with 0.20 g of a zinc hexacyanocobaltate/zinc chloride/hydrogen chloride/glyme/water catalyst prepared as described in Example I of U.S. Pat. No. 4,477,589 and 40 g of ε-caprolactone. The mixture is heated 4 hours at 100° C. to initiate polymerization, and an additional 160 g ε-caprolactone is added incrementally over 5 hours. The mixture is then heated another 12 hours to accomplish complete polymerization of the ε-caprolactone. The product is expected to be a 4000 molecular weight block copolymer wherein the center block is an ethylene oxide/propylene oxide copolymer and the three end blocks are comprised of polymerized caprolactone.

EXAMPLE 11

Preparation of a Polyetherester Using Polycaprolactone an an Initiator

A one-liter reactor equipped as described in Example 1 is charged with 200 g of a commercial 2000 molecular weight polycaprolactone diol (Aldrich Chemical Company), 50 g of 1,4-dioxane (solvent), 0.5 g of zinc hexacyanocobaltate/ dioxane/water catalyst prepared as described in Example 1 of U.S. Pat. No. 3,829,505, and 30 g of a 50/50 (wt./wt.) 1,2-butene oxide/ε-caprolactone mixture.

The mixture is heated with stirring at 100° C. to initiate polymerization (approximately 3 hours). Another 170 g of the 1,2-butene oxide/caprolactone mixture is then added incrementally over 6 hours at 75° C. The reaction mixture is heated an additional 15 hours at 75° C. to complete polymerization of the monomers. Residual solvent is removed under reduced pressure to yield a 4000 molecular weight block copolymer wherein the center block is polycaprolactone and the two end blocks are random copolymers of 1,2-butene oxide and caprolactone.

EXAMPLE 12

Preparation of a High Molecular Weight Lactone/Epoxide Diblock Polymer

A one-liter reactor equipped as described in Example 1 is charged with 0.74 g (0.01 mole) of 1-butanol (initiator), 100 g of tetrahydrofuran, 0.5 g of zinc hexacyanocobaltate/zinc chloride/glyme/water catalyst (prepared as in Example 1), and 50 g of propylene oxide. The tetrahydrofuran and ε-caprolactone are rigorously dried prior to use to remove all traces of water. The mixture is heated to 100° C. for 1 hour to initiate polymerization. Another 250 g of propylene oxide is added incrementally over 4 hours. After allowing the propylene oxide to react completely (6 hours), 200 g of ε-caprolactone is added incrementally over 4 hours. The reaction mixture is heated for another 15 hours at 100° C. The residual solvent and any unreacted monomer are removed under reduced pressure using a wiped film evaporator. The product is expected to be a 50,000 molecular weight diblock polymer wherein one block is a 30,000 molecular weight polypropylene oxide segment and the other block is a 20,000 molecular weight polyraprolactone segment.

I claim:

1. A process for producing a lactone polymer comprising contacting a reaction mixture containing at least one lactone monomer with a catalytically effective amount of a double metal cyanide compound for a time and at a temperature effective to polymerize the lactone monomer.

2. The process of claim 1 wherein the lactone has the general structure

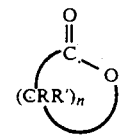

wherein n is an integer from 2 to 8, provided n is not 3, and R and R', which may be the same or different, are selected from the group consisting of hydrogen, alkyl, aryl, alkoxyl, and aralkyl.

3. The process of claim 1 wherein the reaction mixture additionally contains an active hydrogen-containing initiator.

4. The process of claim 1 wherein the reaction mixture additionally contains an organic solvent.

5. The process of claim 1 wherein the temperature is from about 40° C. to 125° C.

6. The process of claim 1 wherein the amount of double metal cyanide compound is from about 50 to 10,000 parts per million based on the weight of lactone monomer.

7. A process for producing a lactone polyol comprising contacting a reaction mixture containing at least one lactone monomer having the general structure

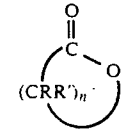

wherein n is an integer from 2 to 8, provided n is not 3, and R and R', which may be the same or different, are selected from the group consisting of hydrogen, alkyl, aryl, alkoxyl, and aralkyl, an active-hydrogen containing initiator, and an organic solvent with from about 50 to 10,000 parts per million of a double metal cyanide compound at a temperature of from about 40° C. to 125° C. for a time effective to polymerize the lactone monomer.

8. The process of claim 7 wherein the lactone monomer is ε-caprolactone.

9. The process of claim 7 wherein the active-hydrogen containing initiator is a polyalcohol having from 2 to 8 hydroxyl groups and a molecular weight of from about 50 to 1000.

10. The process of claim 7 wherein the organic solvent is an ether.

11. The process of claim 7 wherein the double metal cyanide compound is a zinc hexacyanocobaltate.

12. The process of claim 11 wherein the zinc hexacyanocobaltate is a zinc hexacyanocobaltate/zinc chloride/glyme/water complex catalyst.

13. A process for producing a lactone-epoxide copolymer comprising contacting a reaction mixture containing at least one lactone monomer and at least one epoxide monomer with a catalytically effective amount of a double metal cyanide compound for a time and at a temperature effective to copolymerize the lactone monomer and epoxide monomer.

14. The process of claim 13 wherein the lactone has the general structure

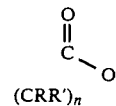

wherein n is an integer from 2 to 8, provided n is not 3, and R and R', which may be the same or different, are selected from the group consisting of hydrogen, alkyl, aryl, alkoxyl, and aralkyl.

15. The process of claim 13 wherein the epoxide monomer is selected from the group consisting of ethylene oxide, propylene oxide, 1,2-butene oxide, 2,3-butene oxide, styrene oxide, 1,2-pentene oxide, cyclohexene oxide, allyl glycidyl ether, and phenyl glycidyl ether.

16. The process of claim 13 wherein the reaction mixture additionally contains an organic solvent.

17. A process for producing a copolymer comprising contacting a reaction mixture of (1) a polymeric active hydrogen-containing initiator selected from the group consisting of epoxide polymers, lactone polymers, and epoxide-lactone copolymers, and (2) at least one cyclic monomer selected from the group consisting of lactones and lactone/epoxide mixtures with a catalytically effective amount of a double metal cyanide compound for a time and at a temperature effective to polymerize the cyclic monomer.

18. The process of claim 17 wherein the reaction mixture additionally contains an organic solvent.

19. The process of claim 17 wherein the polymeric active hydrogen-containing initiator is an epoxide polymer and the lactone is ε-caprolactone.

20. The process of claim 17 wherein the double metal cyanide compound is a zinc hexacyanocobaltate.

* * * * *